United States Patent
Vaïsanen

(12) 
(10) Patent No.: US 6,390,219 B1
(45) Date of Patent: May 21, 2002

(54) REAR SUSPENSION SYSTEM FOR A SNOWMOBILE

(75) Inventor: Esa Vaïsanen, Rovaniemi (FI)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/853,574

(22) Filed: May 14, 2001

Related U.S. Application Data

(60) Provisional application No. 60/234,218, filed on Sep. 21, 2000.

(51) Int. Cl.[7] .................. B62M 27/02; B62D 55/00; B62D 55/14
(52) U.S. Cl. .................. 180/193; 180/9.56; 180/191; 303/127
(58) Field of Search .................. 180/9.1, 9.5, 9.21, 180/9.54, 9.56, 190, 191, 193, 182–186; 305/120, 127

(56) References Cited

U.S. PATENT DOCUMENTS

| | | | | |
|---|---|---|---|---|
| 3,545,821 A | * | 12/1970 | Erickson | 180/193 |
| 4,284,161 A | * | 8/1981 | Blass | 180/184 |
| 4,314,618 A | | 2/1982 | Tamura | |
| 4,671,521 A | | 6/1987 | Talbot et al. | |
| 4,987,965 A | | 1/1991 | Bourret | |
| 5,265,692 A | | 11/1993 | Mallette | |
| 5,586,614 A | * | 12/1996 | Kouchi et al. | 180/190 |
| 5,727,643 A | | 3/1998 | Kawano et al. | |
| 5,881,834 A | * | 3/1999 | Karpik | 180/193 |
| 5,944,134 A | * | 8/1999 | Peppel et al. | 180/193 |
| 6,032,752 A | * | 3/2000 | Karpik et al. | 180/193 |
| 6,237,706 B1 | * | 5/2001 | Karpik et al. | 180/193 |
| 6,283,241 B1 | * | 9/2001 | Kubota | 180/193 |

FOREIGN PATENT DOCUMENTS

| | | | | |
|---|---|---|---|---|
| DE | 2928628 | * | 4/1980 | 180/182 |
| JP | 256082674 | * | 7/1981 | 180/193 |
| JP | 0299994 | * | 12/1990 | 180/190 |
| SU | 001706654 | * | 1/1992 | 180/191 |

* cited by examiner

Primary Examiner—Brian L. Johnson
Assistant Examiner—Matthew Luby
(74) Attorney, Agent, or Firm—Pillsbury Winthrop LLP

(57) ABSTRACT

A snowmobile suspension that provides a substantially constant motion-ration (i.e. reduced falling rate) over the entire suspension stroke of the suspension system. The suspension system includes a suspension assembly that includes a lower arm assembly, a suspension arm, and a shock absorber. The lower arm assembly pivotally interconnects the lower portion of the suspension arm and the lower end of the shock absorber to the slide frame at a location relative to the chassis and within the endless track. The upper portion of the suspension arm and the upper end of the shock absorber pivot independently from each other, and the upper portion of the suspension arm is positioned lower and forward of the upper end of the shock absorber. The upper end of the shock absorber is positioned relative to the chassis and within the endless track. The mounting positions defined by (i) the upper end of the suspension arm, (ii) the upper end of the shock absorber, (iii) the lower end of the suspension arm, and (iv) the lower end of the shock absorber cooperate to provide a substantially constant motion-ratio as the slide frame collapses toward the frame element.

24 Claims, 11 Drawing Sheets

REAR SUSPENSION SYSTEM FOR A SNOWMOBILE

The present application claims priority to U.S. Provisional Application of Vaisanen, filed Sep. 21, 2000, Serial No. 60/234,218, the entirety of which is hereby incorporated into the present application by reference.

FIELD OF THE INVENTION

This invention relates to snowmobiles, and more particularly to the rear suspension of a snowmobile suspension systems.

BACKGROUND

Tracked vehicles such as snowmobiles have rear suspensions generally consisting of front and rear suspension arms pivotally mounted on shafts, which are rotatably connected to a slide frame. The slide frame comprises a pair of laterally spaced apart slide rails or longitudinal skids interconnected transversely on opposing lateral sides of the snowmobile. The slide rails are in sliding contact with an endless track which contacts the snow surface and drives the snowmobile. The front and rear suspension arms pivotally interconnect the chassis of the snowmobile to the slide frame.

As is well known, snowmobiles travel over a wide range of terrain. It is not uncommon for a snowmobile to encounter unexpected and abrupt changes in that terrain. The suspension system must offer sufficient stiffness to absorb and dissipate the forces and energy associated with these abrupt terrain changes. Additionally, aggressive riding of the snowmobile, such as becoming airborne, may require an even greater stiffness and improved shock performance. To provide adequate stiffness for extreme terrain conditions and aggressive riding, while at the same time providing a smooth ride when travelling over relatively smooth surfaces, it is particularly desirable to provide a suspension system that affords a fairly large degree of suspension "travel." Suspension "travel" refers to the vertical distance through which the suspension collapses upon application of a force from terrain conditions or aggressive riding. Due to the space limitations, it has been difficult to provide a suspension system that provides a wide degree of suspension travel with adequate stiffness throughout the entire range of travel.

When shock absorbers are included in the suspension in simple fashion without extra linkages, as is common practice in the prior art, the shock absorbers produce what is known in the industry as a "falling rate," referring to the fact that the speed of the shock absorbers decreases, or decelerates, during compression of the suspension. This occurs because, in the conventional system, as the slide frame moves toward the snowmobile chassis, i.e., the shock collapses, the displacement of the shock relative to the slide frame decreases. The falling rate is quantified by the ratio of the displacement of the shock to the displacement of the slide frame, which is referred to as the "motion-ratio." A smaller displacement of the shock in the same period of time (i.e., a low motion-ratio) translates into a slower shock "absorber speed." Because the damping force in a shock absorber is directly proportional to the velocity of the shock absorber piston, as the shock absorber speed decreases, the damping force, or reaction force of the shock, also decreases. This falling rate geometry has been looked upon somewhat disfavorably in the prior art because, in a typical prior art suspension having a maximum of 7 inches of travel or less (between the suspension arms and the slide rails), there is a tendency for the suspension to "bottom out" more easily. In other words, the suspension arms come into contact with the slide rails.

One design approach used to alleviate the tendency of a shock absorber to bottom out is to provide a suspension system with a shock absorber having a progressive dampening effect, such as that disclosed in U.S. Pat. No. 5,881,834, which is incorporated in its entirety herein by reference. A progressive dampening effect is achieved by progressively decreasing the flow area through which the by-pass fluid is routed during the stroke of the piston within the shock absorber. In the '834 patent, a helical, tapered passage is formed along the side of the interior wall of the shock absorber cylinder so that when the shock absorber is compressed or extended, the area of the passage decreases, resulting in increased by-pass flow restriction. This, in turn, forces more fluid to travel through the normal valving mechanism, thus providing a progressive dampening effect that helps prevent bottoming-out of the suspension.

Another design approach to prevent bottoming-out is to provide a shock absorber system that contains a progressive rate (i.e., a "rising rate" design). In a progressive rate system, the speed of the shock absorber increases as the suspension system collapses and, therefore, the force required for successive increments of compression increases. Progressive rate suspension systems are usually found in racing-type snowmobiles with complicated linkage arrangements that manipulate the shock absorber travel into progressively faster shock speed during suspension travel. Such systems are disclosed in U.S. Pat. Nos. 5,727,643 and 4,462,480. However, with conventional snowmobile suspensions, it has been difficult to incorporate an arrangement that provides a progressive spring rate without the use of complex linkages.

SUMMARY OF THE INVENTION

Therefore, a need has developed for a snowmobile suspension system with a reduced falling rate (i.e., a substantially constant motion-ratio), without the use of complex linkages, that provides adequate stiffness for both extreme and smooth terrain conditions.

Accordingly, the present invention provides a snowmobile suspension that includes a slide frame for engagement with an endless track, a frame element that connects to a chassis on the snowmobile, a suspension arm, a lower arm assembly, and a shock absorber. The lower arm assembly has a lower end and an upper end, with the upper end pivotally mounted relative to the slide frame. The suspension arm has an upper end pivotally mounted relative to the frame element and a lower end pivotally mounted to the lower end of the lower arm assembly. The shock absorber has an upper end pivotally mounted relative to the frame element and a lower end pivotally mounted to the lower end of the lower arm assembly. The upper end of the suspension arm is positioned forward of and below the upper end of the shock absorber and pivots independently of the upper end of the shock absorber. The upper end of rear shock absorber is positioned adjacent the frame element and the lower end of the shock absorber is positioned adjacent the slide frame. The mounting positions defined by (i) the upper end of the suspension arm, (ii) the upper end of the shock absorber, (iii) the lower end of the suspension arm, and (iv) the lower end of the shock absorber cooperate to provide a substantially constant motion-ratio as the slide frame collapses toward the frame element.

Other features and advantages of the present invention will be realized in accordance with the following detailed description, appended drawings, and claims.

BRIEF DESCRIPTION OF DRAWINGS

The present invention is further described in the detailed description which follows, by reference to the noted drawings by way of non-limiting exemplary embodiments, in which like reference numerals represent similar parts throughout the several views of the drawings, and wherein.

DETAILED DESCRIPTION OF THE DRAWINGS

While the present invention will hereinafter be described in connection with at least one exemplary embodiment thereof, it should be understood that it is not intended to limit the invention to that embodiment. On the contrary, it is intended to cover all alternatives, modifications and equivalents as may be included within the spirit and scope of the invention as defined by the appended claims.

Figure 1:
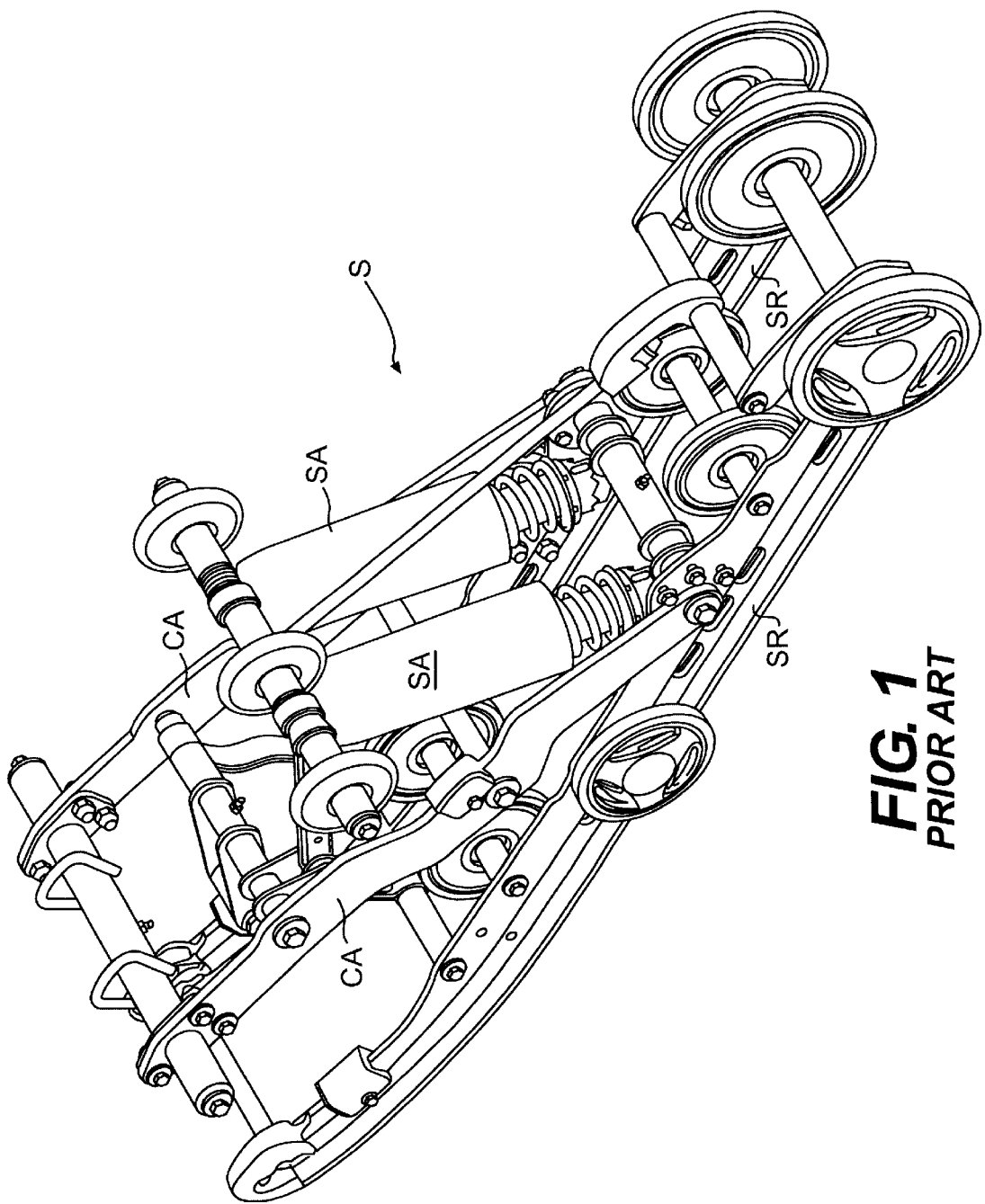
FIG. 1 is a perspective view of a prior art snowmobile suspension system.

FIG. 1 is a perspective illustration of a suspension S typically found in the prior art. Suspension S includes two slide rails SR connected to the chassis of the snowmobile (not shown) by shock absorbers SA and connecting arms CA. Shock absorbers SA cushion the movement of suspension S when suspension S encounters rough terrain or is subjected to aggressive riding conditions.

Figure 2:
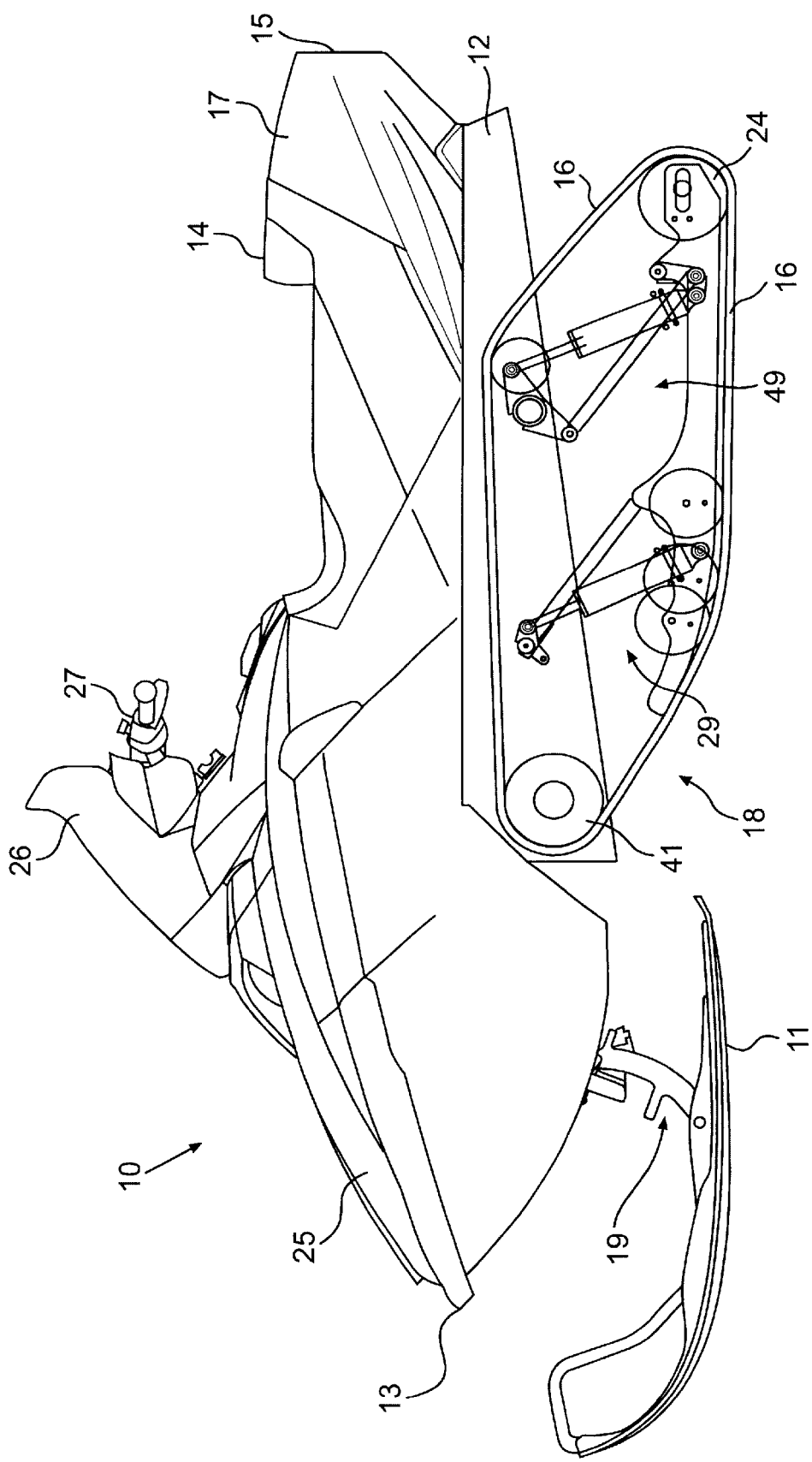
FIG. 2 is a schematic of an overall view of a snowmobile together with the suspension system of the preferred embodiment of the present invention.

Referring to FIG. 2, an exemplary embodiment of a snowmobile 10 of the present invention is generally shown having a forward end 13 and a rearward end 15 (that are defined consistently with the travel direction of the vehicle). Snowmobile 10 includes a body 17 (i.e., the exterior upper portions) and a chassis 12. While not shown in FIG. 2, an engine is carried by the chassis 12 at its forward end. In addition, two skis 11 are attached to the forward end of the chassis 12 through a front suspension 19. A drive track 16 of a rear suspension, generally indicated by reference numeral 18, is disposed under the chassis 12 and is connected operatively to the engine for propulsion of the vehicle. As is shown more clearly in FIGS. 3 and 4, rear track support wheels 24 are supported on the slide rails 28 of a slide frame 20 by an axle shaft 32.

At the front of the chassis 12, snowmobile 10 includes fairings 25 that enclose the engine to protect it and to provide an external shell that can be decorated so that the snowmobile is aesthetically pleasing. Typically the fairings 25 comprise a hood and a bottom pad (neither of which have been individually identified in the Figures). A windshield 26 may be connected to the fairings 25 near the forward end 13 of the snowmobile 10. The windshield 26 acts as a windscreen to lessen the force of the air on a rider when the snowmobile 10 is moving.

A seat 14 extends from rearward end 15 of snowmobile 10 to the fairings 25. A steering device 27, such as a handlebar, is positioned forward of the rider and behind the engine. Two footrests (not shown) are positioned on either side of seat 14 to accommodate the rider's feet.

Figure 3:
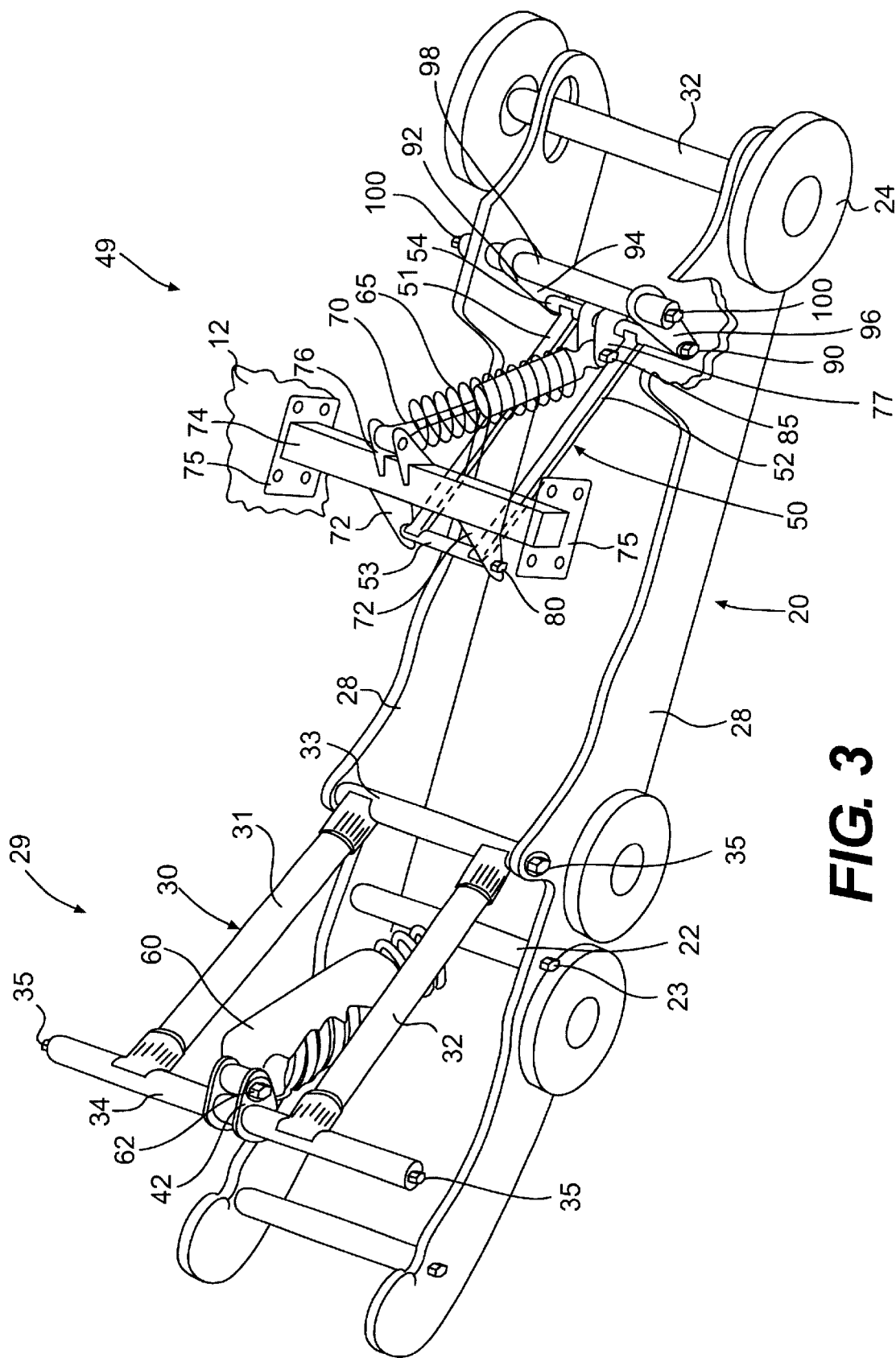
FIG. 3 is a perspective view of the preferred embodiment of the snowmobile suspension system of the present invention.
Figure 4:
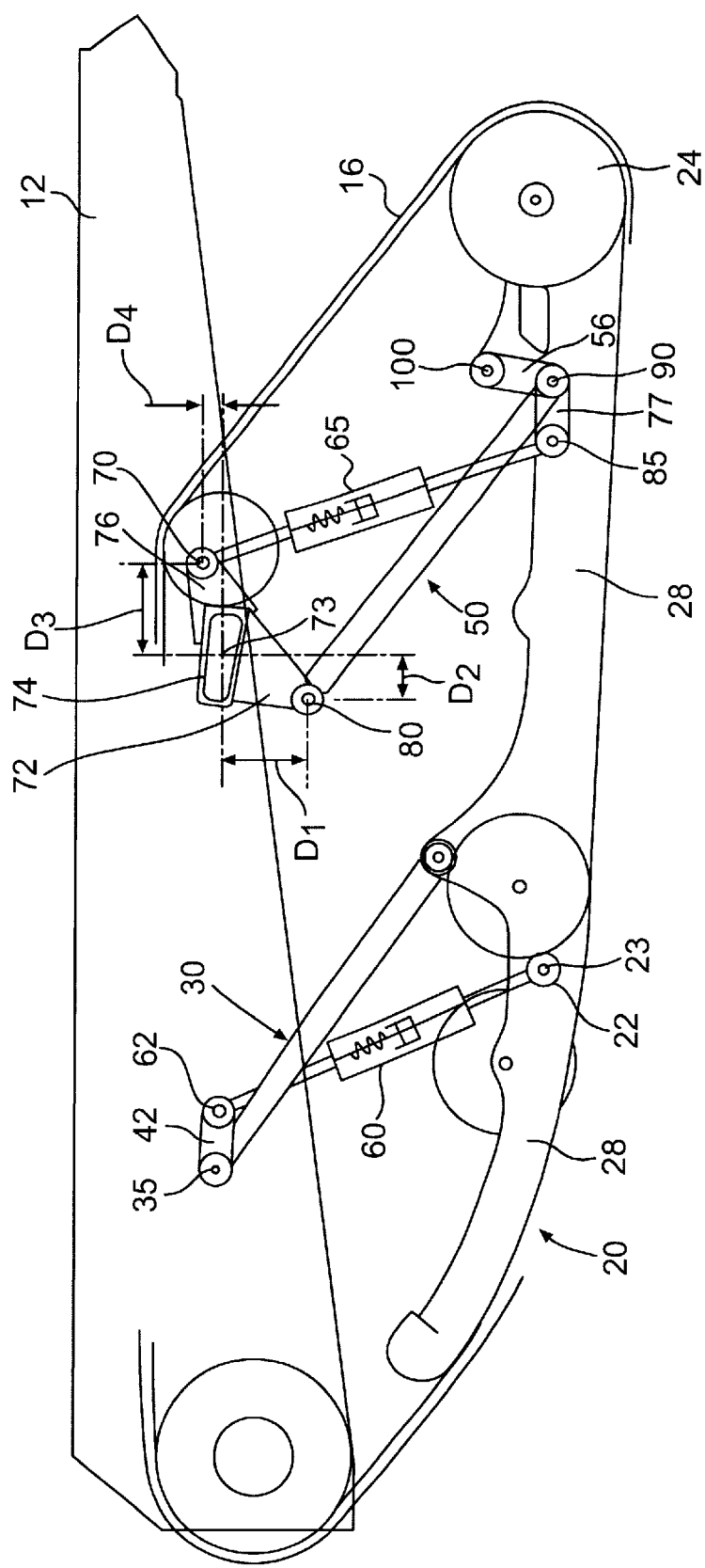
FIG. 4 is a side view of the preferred embodiment of the snowmobile suspension system of the present invention.

Referring to FIGS. 3 and 4, the rear suspension system of the snowmobile 10 comprises a slide frame 20 that is connected to the chassis 12 through the front and rear suspension assemblies generally indicated as 29 and 49, respectively. Each of the front and rear suspension assemblies 29, 49 comprises, among other things, front and rear suspension arms 30 and 50, respectively, and front and rear shock absorbers 60 and 65, respectively. The rear suspension assembly 49 and its configuration, which will be described in detail below, represent an aspect of the present invention. In the embodiment shown in FIG. 3, the front and rear shock absorbers 60, 65 are preferably of the coil-over piston-damper type. The helical springs within these shock absorbers act as biasing elements that urge the slide frame 20 away from the chassis 12. While coil-over piston-damper shock absorbers are preferred, other types of shock absorbers can alternatively be used, such as piston-dampers in conjunction with torsion springs as the biasing element.

The slide frame 20 comprises two longitudinally extending transversely spaced apart slide rails 28 that are transversely interconnected by suitable cross-structures to form a generally rigid structure. The lower surfaces of the slide rails 28 are coated in a known manner with a suitable low friction material such as nylon, Teflon®, and preferably an UHMW (ultra high molecular weight polymer), for sliding contact with the track belt.

As shown in FIG. 3, front and rear suspension arms 30 and 50, respectively, connect the slide rails 28 with the chassis 12. The front suspension arm 30 is a trapezoidally-shaped structure that includes an upper tube portion 34 and a lower tube portion 33 that are connected by two tubes or bars 31 and 32. In an exemplary embodiment, the components are all welded together to form an integral structure, i.e., the front suspension arm 30. The upper tube portion 34 of the front suspension arm 30 is pivotally mounted on a first transverse shaft (not shown) that is fixedly or pivotally attached to the chassis 12 by means of bolts 35. Likewise, the lower tube portion 33 of the front suspension arm 30 is pivotally mounted on a second transverse shaft (not shown) that is fixedly attached to the respective slide rails 28 by bolts 35. Therefore, as the slide frame 20 displaces vertically, the front suspension arm 30 is able to pivot about the first transverse shaft relative to the chassis 12 and simultaneously pivot about the second transverse shaft relative to the slide frame 20.

A front shock absorber 60 extends from the upper tube portion 34 of the front suspension arm 30 downwardly and rearwardly to be pivotally connected to a lower shaft (not shown) that is fixedly attached to slide rails 28 by bolts 23, as shown in FIG. 3. Two tubes 22 are mounted on the lower shaft to center the front shock absorber 60 on the lower shaft. The upper end of the front shock absorber 60 is pivotally attached to a bracket arm 42 by a bolt 62, and the bracket arm 42, in turn, is fixedly connected to the upper tube portion 34 of front suspension arm 30.

The rear suspension assembly 49 and its attachment to the chassis 12 and slide frame 20 represent an aspect of the present invention. Specifically, as shown in FIGS. 3 and 4, an aspect of the present invention is the location of and connection to the chassis 12 and the slide frame 20 of the rear suspension arm 50 and rear shock absorber 65, which will now be described.

The rear suspension assembly 49 includes, among other things, a rear suspension arm 50, a shock absorber 65, a transverse cross bar 74 (also referred to as a frame element 74), and a lower arm assembly 92. The rear suspension arm 50 is a trapezoidally-shaped structure that includes a transverse rear upper tube portion 53 and a transverse rear lower tube portion 54 that are connected by two tubes or bars, 51 and 52. In an exemplary embodiment, the components of the rear suspension arm 50 are all welded together to form an integral structure.

Figure 5:
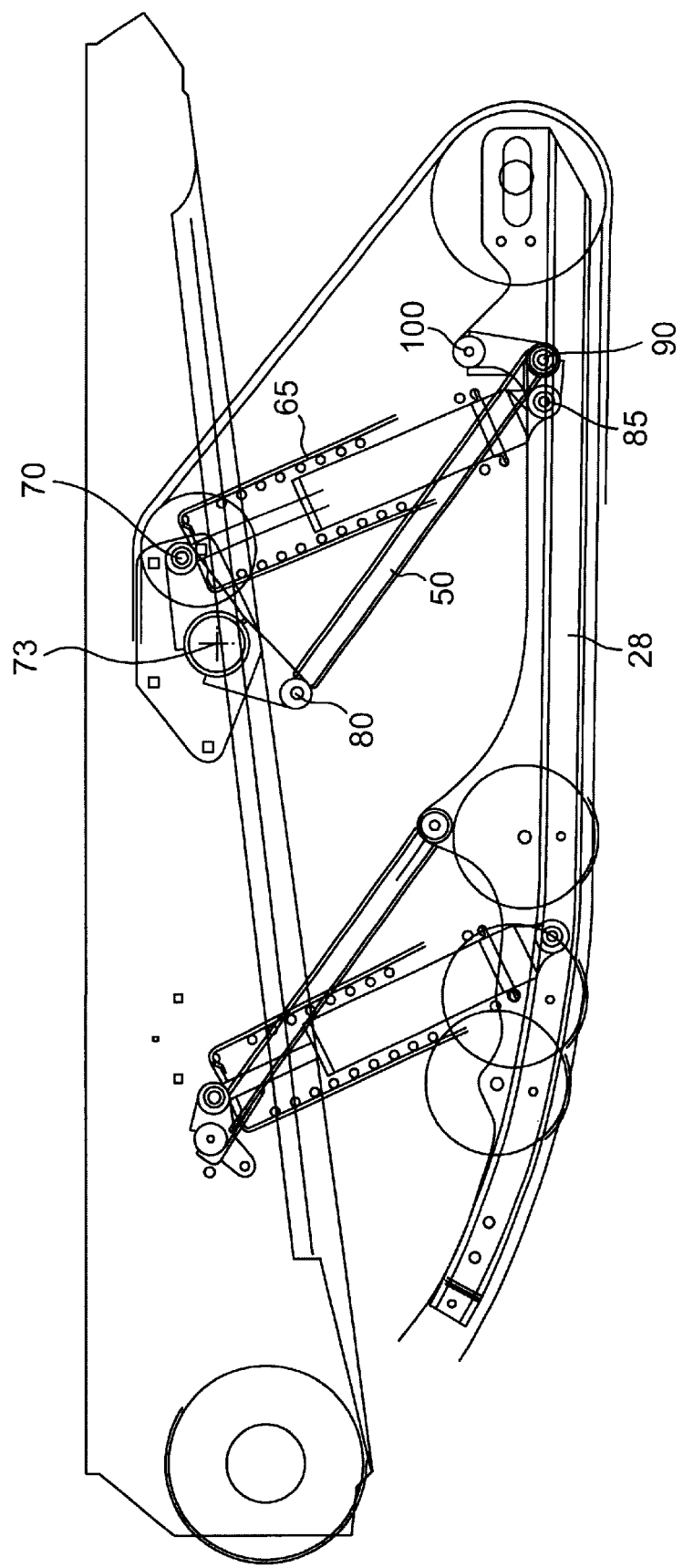
FIG. 5 is a kinematic diagram of the preferred embodiment of the snowmobile suspension system of the present invention, shown in the fully extended position.
Figure 6:
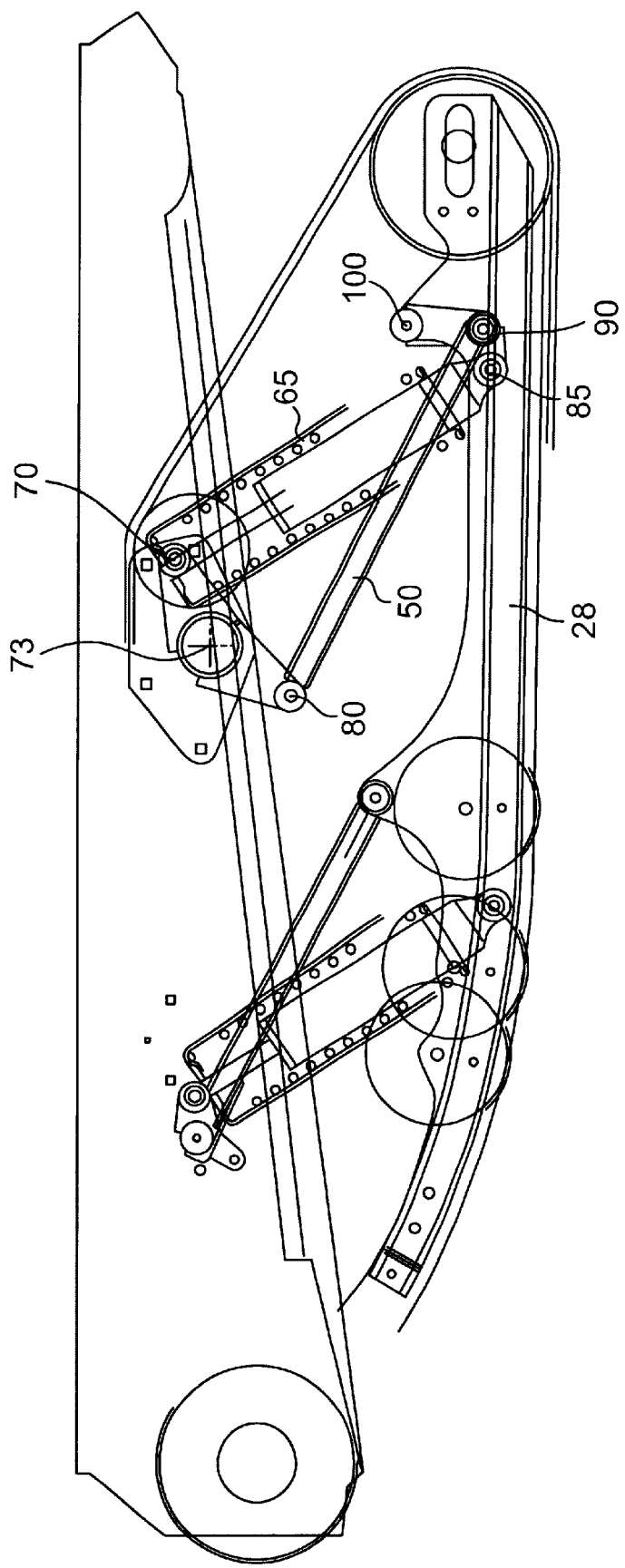
FIG. 6 is a side view of a kinematic diagram of the preferred embodiment of the snowmobile suspension system of the present invention, which is shown in a two inch collapsed position.
Figure 7:
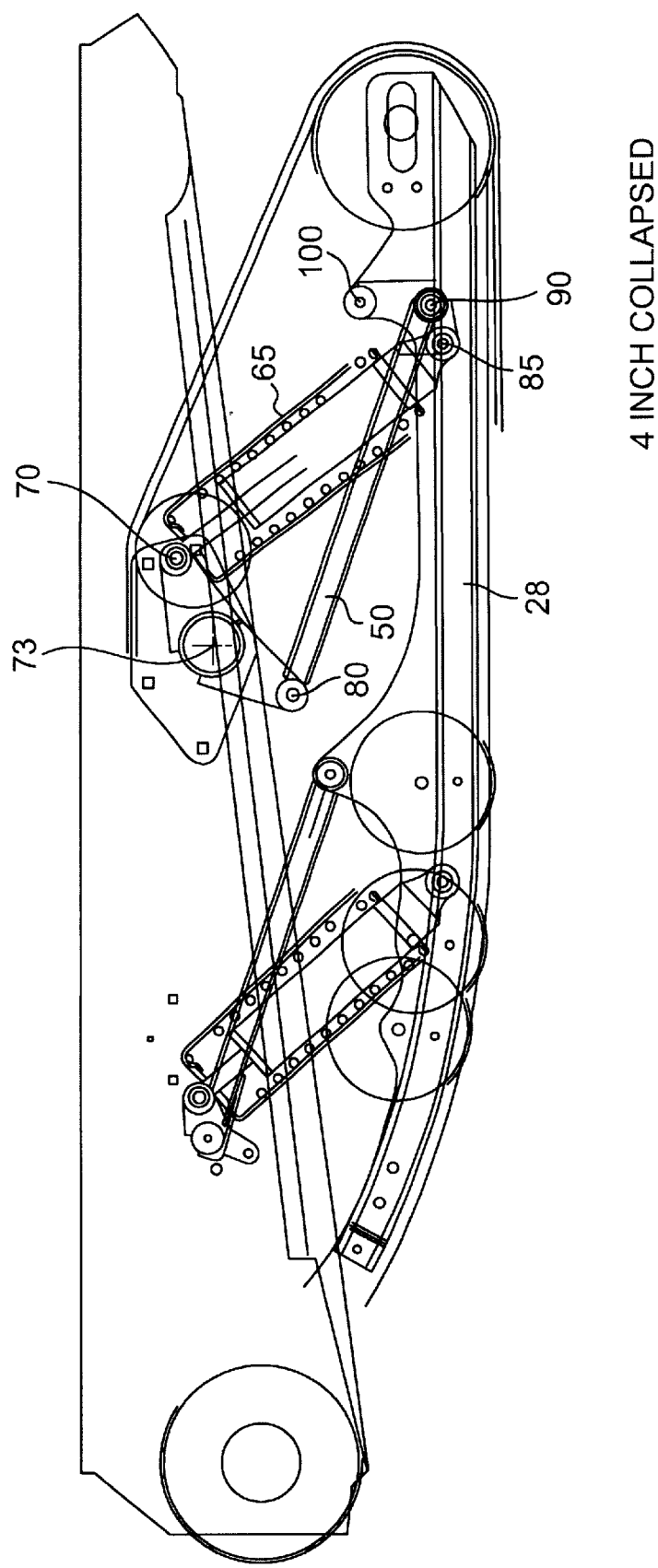
FIG. 7 is a side view of a kinematic diagram of the preferred embodiment of the snowmobile suspension system of the present invention, which is shown in a four inch collapsed position.
Figure 8:
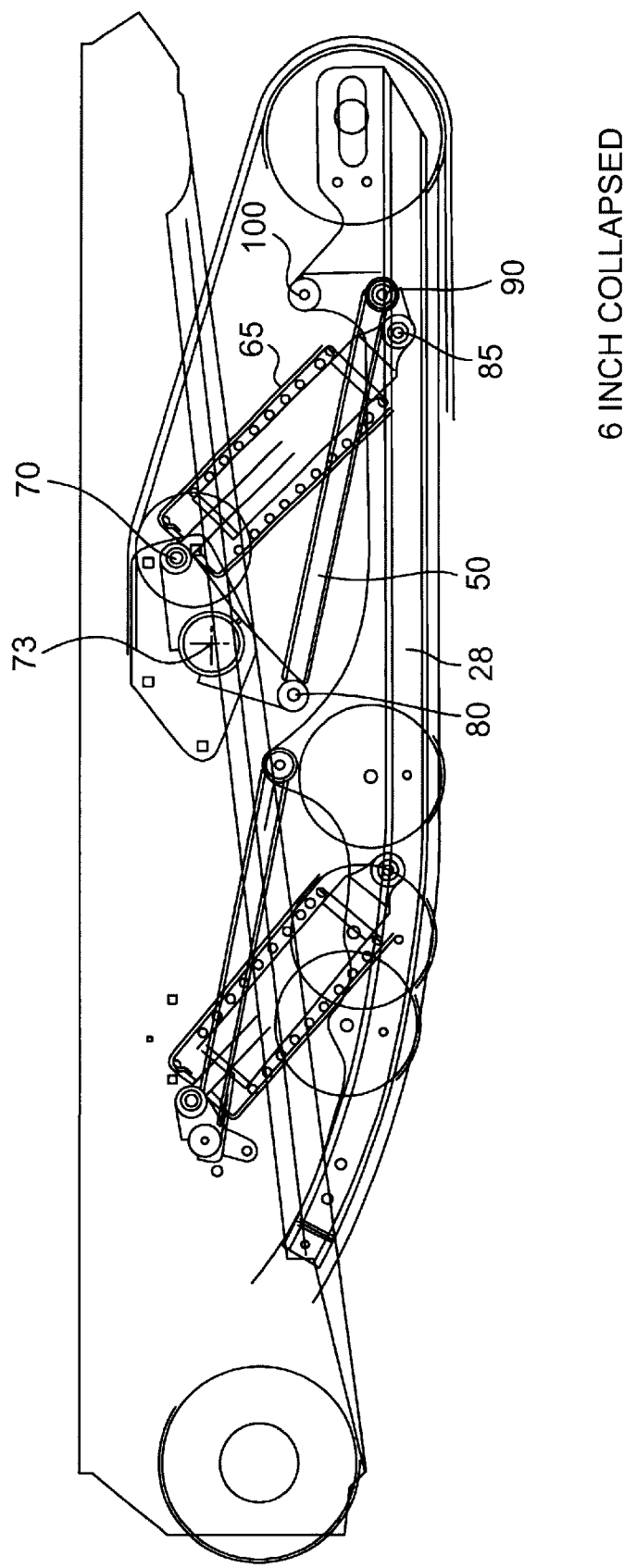
FIG. 8 is a side view of a kinematic diagram of the preferred embodiment of the snowmobile suspension system of the present invention, which is shown in a six inch collapsed position.
Figure 9:
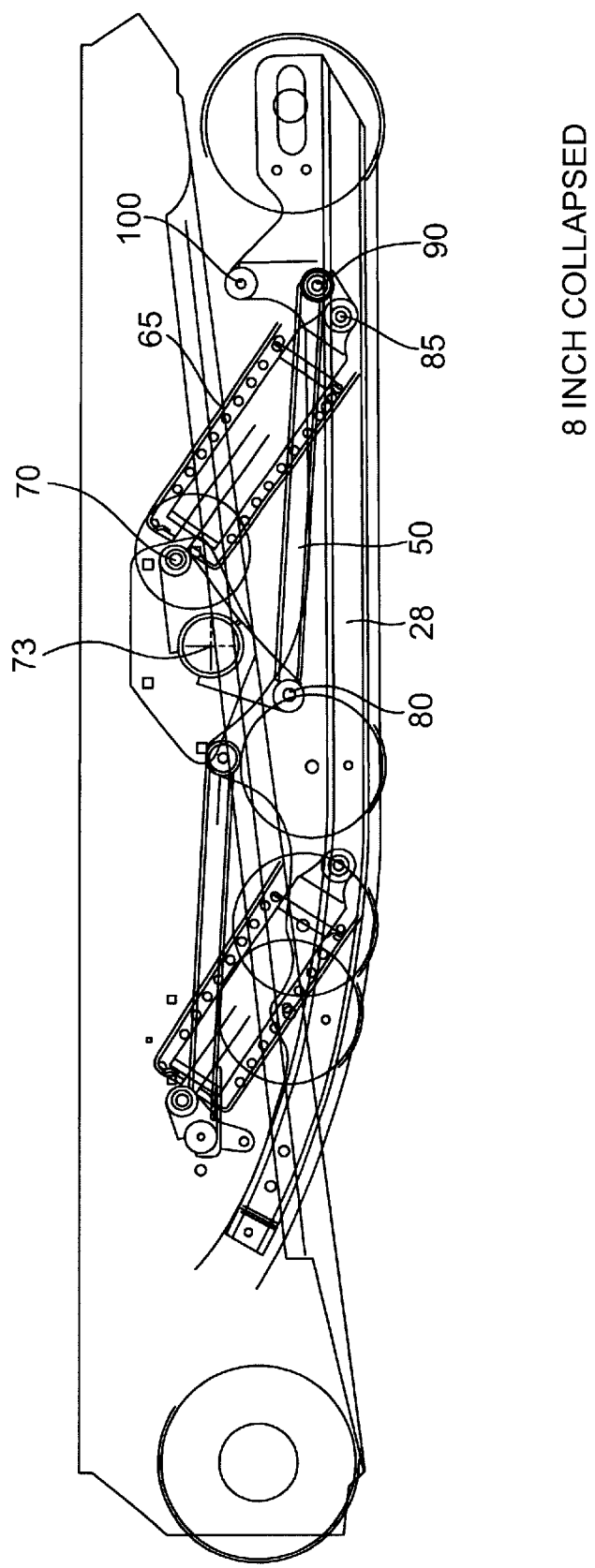
FIG. 9 is a side view of a kinematic diagram of the preferred embodiment of the snowmobile suspension system of the present invention, which is shown in an eight inch collapsed position.
Figure 10:
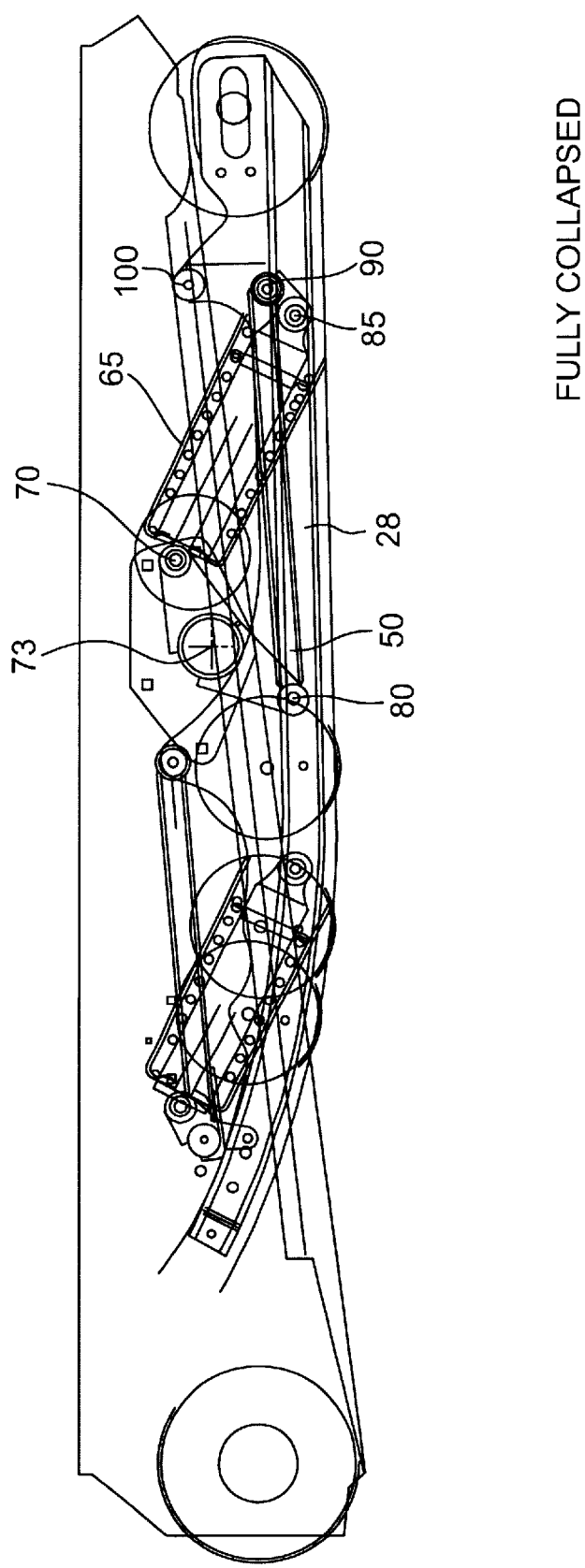
FIG. 10 is a side view of a kinematic diagram of the preferred embodiment of the snowmobile suspension system of the present invention, which is shown in a fully collapsed position.

The connection of the rear suspension arm 50 and the rear shock absorber 65 to the chassis 12 and slide frame 20 will now be described. As shown in FIG. 3, the rear suspension arm 50 is interconnected to the chassis 12 by two extension brackets 72 and a transverse cross bar 74, the cross bar 74 being fixedly attached to the chassis 12. The transverse cross bar 74 can have any cross-sectional shape, such as rectangular or circular, as shown in FIGS. 4 and 5, and has a central axis 73. In an exemplary embodiment, flanges 75 are welded at both ends of the cross bar 74, and the flanges 75 are, in turn, bolted or otherwise fixedly attached to the chassis 12. The extension brackets 72 are fixedly attached, preferably by welding, to the cross bar 74 at intermediate portions thereof. The distal end of each of the extension brackets 72 is positioned forward and downward from the axis 73 of the cross bar 74, as seen in FIG. 4. The upper tube portion 53 of the rear suspension arm 50 is pivotally mounted on a fourth transverse shaft (not shown) that is fixedly attached to the extension brackets 72 adjacent their respective distal ends by means of bolts 80, thus defining a pivot point for the rear suspension arm 50. Therefore, the rear suspension arm 50 is able to rotate with respect to the extension brackets 72, the cross bar 74, and the chassis 12 by pivoting about the fourth transverse shaft, the mounted position of which is defined by bolts 80.

The lower arm assembly 92 comprises two lower arm brackets 94 and 96 having a first end (upper) and a second end (lower), the first end of each bracket 94, 96 being fixedly connected to a transverse tube 98. The tube 98 of the lower arm assembly 92 is pivotally mounted to a fifth transverse shaft (not shown) that is fixedly connected to the slide rails 28 by means of bolts 100. A free-floating transverse shaft 91 (shown by dashed line) is fixedly attached at each of the second ends of the lower arm brackets 94, 96 by bolts 90. This free-floating transverse shaft 91 pivotally supports the lower tube portion 54 of the rear suspension arm 50. That is, the rear suspension arm 50 and the lower arm assembly 92 are pivotally connected to each other at the lower tube portion 54 of the rear suspension arm 50, thus establishing the connection between the slide frame 20 and the rear suspension arm 50. The lower tube portion 54 of the rear suspension arm pivots around the free-floating transverse shaft 91, which is fixedly attached to the second (lower) ends of the lower arm brackets 94, 96 by means of bolts 90. The free-floating shaft 91 is not attached to the slide frame 20, but is rather attached to the lower arm assembly 92 via the lower arm brackets 94, 96. Therefore, the lower arm assembly 92 is able to rotate relative to the slide frame 20 by pivoting about the fifth transverse shaft, the mounted position of which is defined by bolts 100. In turn, the lower tube portion 54 of rear suspension arm 50 pivots about the free-floating transverse shaft 91 and translates as the lower arm assembly 92 rotates.

Rear shock absorber 65 extends from the transverse cross bar 74 downwardly and rearwardly to pivotally attach to the lower tube portion 54 of the rear suspension arm 50. The upper end of the rear shock 65 is pivotally mounted between a second pair of extension brackets 76 by bolt 70. The extension brackets 76, in turn, are fixedly connected, preferably by welding, to the cross bar 74 at an intermediate location thereon. The lower end of the rear shock absorber 65 is pivotally mounted to a bracket arm 77 by bolt 85, the bracket arms 77 in turn are fixedly connected to the lower tube portion 54 of the rear suspension arm 50, which, in turn, is pivotally mounted to the lower arm assembly 92, as discussed above.

The longitudinal and vertical distances between the pivot point 80 (the mounted location of the upper end of suspension arm 50) and pivot point 70 (the mounted location of the upper end of the rear shock absorber 65) are designated as "D1" and "D2", respectively. Although not intended to be limiting, in an exemplary embodiment, D1 is approximately 4.4 inches. However, the distance D1 may be within the range of 1.0 and 8 inches. In an exemplary embodiment, D2 is approximately 4.0 inches. However, the distance D2 may be within the range of 1.0 and 10 inches.

By the above configuration, as the slide frame 20 displaces vertically, the rear suspension arm 50 is able to rotate with respect to the chassis 12 by pivoting about the fourth transverse shaft, the position of which is defined by the bolts 80, and by pivoting about the free-floating transverse shaft 91 that is fixedly connected to the lower arm assembly 92, the position of which is defined by the bolts 90. Simultaneously, as the slide frame 20 displaces vertically, the lower arm assembly 92 is able to rotate relative to the slide frame 20 by pivoting about the fifth transverse shaft that is fixedly connected to the slide rail 20, the position of which is defined by the bolts 100.

To illustrate the above, the displacement of the rear suspension system 18, i.e., the front and rear suspension assemblies 29, 49, from the fully extended position to the fully collapsed position are depicted in FIGS. 5–10. FIG. 5 shows the rear suspension system 18 in the fully extended position. FIGS. 6–10 show the rear suspension system 18 in various collapsed positions of 2 inches, 4 inches, 6 inches, 8 inches, and fully collapsed, respectively.

As noted above, an aspect of the present invention is the location of and connection to the chassis 12 and the slide frame 20 of the rear suspension arm 50 and the rear shock absorber 65, respectively. Specifically, the upper end of the rear shock absorber 65, defined by bolt 70, is positioned as high as possible from the slide rails 28, while the lower end of the rear shock 65, defined by bolt 85, is positioned as low as possible on suspension arm 50. Additionally, the upper end of the rear suspension arm 50, defined by bolts 80, is connected to the chassis 12 at a significantly lower point relative to the upper end of rear shock 65 (at bolt 70) than that seen in the prior art, which is accomplished by the use of the downwardly and forwardly-extending extension brackets 72 relative to the axis 73 of the cross bar 74. That is, the pivot point, represented by the bolts 80, of the rear suspension arm 50 is lower and slightly forward of the axis of the cross bar 74. Conversely, the upper end of the shock absorber 65 (at bolt 70) is positioned rearward and slightly above the cross bar 74, which is facilitated by the second pair of extension brackets 76. Furthermore, the lower end of the rear suspension arm 50, defined by bolt 90, is interconnected to the slide rails 28 by the lower end (second end) of lower arm assembly 92 via the free-floating, transverse shaft 91. The above described attachment points of the upper and lower end of the rear suspension arm 50 and the upper and lower end of the rear shock absorber 65, are defined by the bolts 80, 90, 70, and 85, respectively, combined with the lower arm assembly 92. Together, they cooperate to provide a suspension system 18 with a substantially flat motion-ratio curve over the entire compression cycle.

Figure 11:
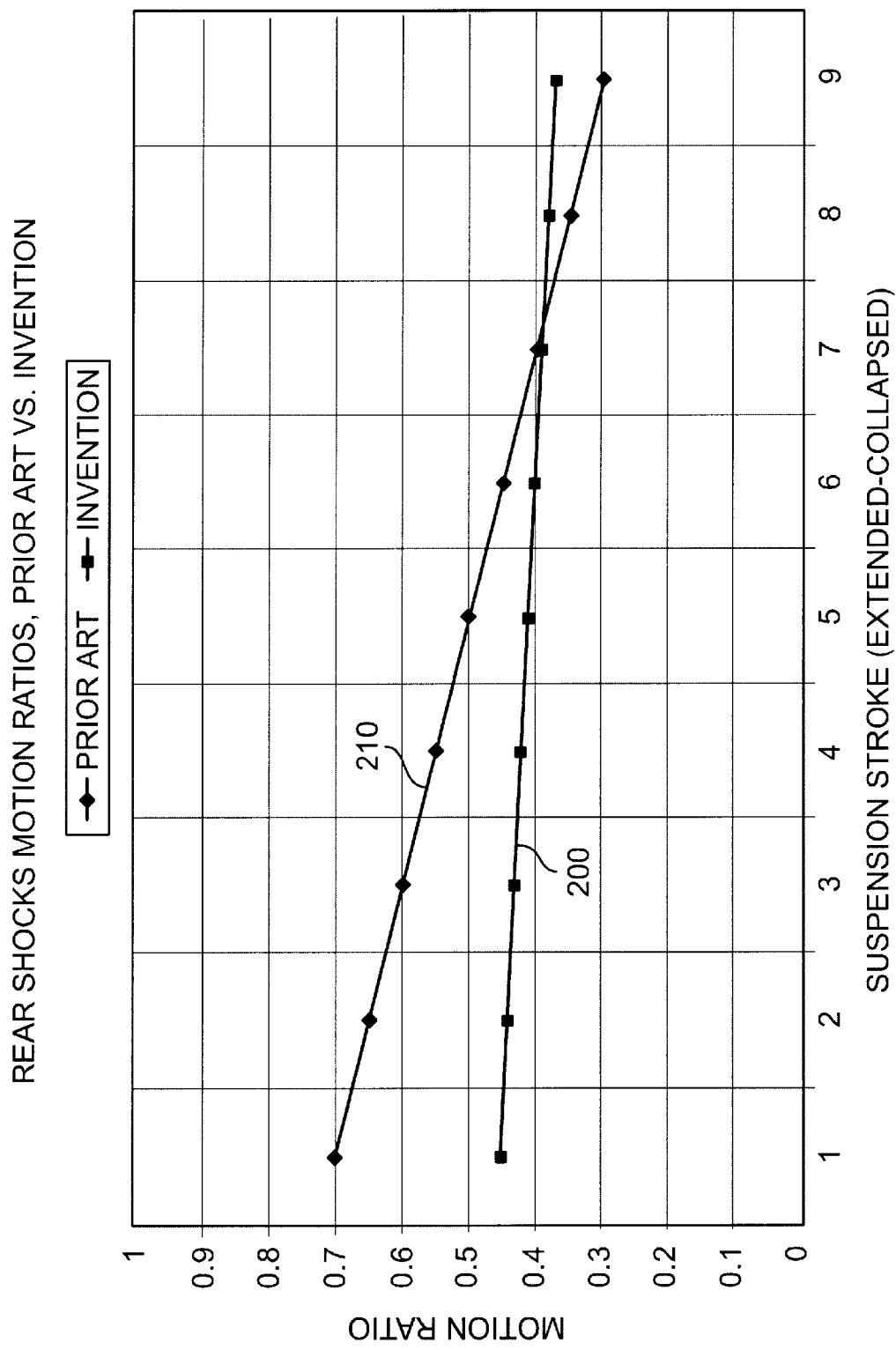
FIG. 11 is a graph of motion ratio vs. suspension stroke, comparing the suspension system of the preferred embodiment of the present invention with the prior art suspension system shown in FIG. 1.

FIG. 11 is a graph of motion-ratio v. suspension stroke (ss). Motion-ratio is defined as a deflection of the piston within the shock absorber (Dsa) (i.e., the shock absorber deflection) divided by deflection of the slide rail (Dsr). The suspension stroke is a measure, in inches, of how much the suspension system has collapsed, i.e., it is essentially the deflection of the slide rail (Dsr). Curve 200 is actual data of the rear suspension system 18 of the illustrated embodiment, and curve 210 is actual data of the prior art suspension system shown in FIG. 1. As seen from the graph in FIG. 11, the motion-ratio curve 200 remains relatively constant throughout the suspension stroke, while the prior art motion-ratio curve 210 changes considerably throughout the suspension stroke. To understand the benefits of a relatively constant motion-ratio curve, the prior art curve is first discussed.

Referring to the prior art curve 210, the suspension system has a high motion-ratio (approximately equal to 0.7) when the suspension system is in the extended position. This indicates that, as the slide rails move upward toward the chassis, the shock absorber compresses seven tenths of that of the slide rail in the same period of time, yielding a high motion-ratio. Because the stiffness of the shock is proportional to the speed at which it compresses, where the shock absorber speed is high, the shock absorber in the extended position is relatively stiff. As the suspension system collapses, the motion-ratio reduces dramatically. This indicates that as the slide rail continues to collapse, i.e., displace towards the chassis, the shock absorber displaces significantly less than the slide rail in the same period of time. Thus, since the speed of the shock absorber decreases, the shock absorber becomes less stiff as the suspension system collapses. This phenomenon is referred to as the "falling rate," referring to the fact that the speed of the shock absorbers decreases, or decelerates, during compression of the suspension, and the falling rate of a suspension system is quantified by motion-ratio curve.

As seen from FIG. 11, the falling rate (i.e., the slope) of the suspension system of the preferred embodiment (curve 200) is significantly reduced from that of the prior art suspension system of FIG. 1. That is, the motion-ratio of the preferred embodiment of the present invention is substantially constant over the entire suspension stroke, while in the prior art, the motion-ratio varies significantly over the suspension stroke.

In order to prevent "bottoming-out" of the shock as the prior art suspension system approaches the collapsed position, a stiff shock absorber must be selected (i.e., a shock with a high damping coefficient). A stiff shock will compensate for the slower shock absorber speed as the suspension system approaches the collapsed position. However, this stiff shock compromises the suspension system when the shock is extended because, there, the motion-ratio is high, and a shock absorber with a high damping coefficient is not necessary. Thus, the suspension system becomes extremely stiff when the suspension system is in the fully extended position. Therefore, the prior art requires a compromise at either end of the suspension stroke in the selection of a shock absorber. That is, if a manufacturer selects a shock absorber with a low damping coefficient, i.e., a shock with low stiffness, which is preferable when the suspension system is in the fully extended position, the shock absorber will likely bottom-out when the suspension system nears the collapsed position because, there, a stiffer shock is required. If a manufacturer selects a shock absorber with a high damping coefficient in order to prevent bottoming out in the collapsed position, the suspension system toward the fully extended position will be overly stiff.

With the suspension system of the illustrated embodiment, because the motion-ratio is relatively constant over the range of the suspension stroke, a selected shock absorber will provide better damping over the suspension stroke without having to make a compromise in the suspension performance at either end of the suspension stroke. That is, a shock absorber selected with a damping coefficient to prevent bottoming out in the collapsed position will not cause the suspension system to be overly stiff when in the fully extended position because the motion-ratio, and thus the speed of the shock absorber, remains relatively constant over the suspension stroke.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims.

What is claimed is:

1. A snowmobile suspension, comprising:
    a slide frame for engagement with an endless track;
    a frame element for connection to a chassis on a snowmobile;
    a lower arm assembly with a lower end and an upper end, the upper end being pivotally mounted relative to the slide frame;
    a suspension arm with an upper end pivotally mounted relative to the frame element and a lower end pivotally mounted to the lower end of the lower arm assembly; and
    a shock absorber with an upper end pivotally mounted relative to the frame element and a lower end pivotally mounted relative to the suspension arm,
    wherein the upper end of the suspension arm is positioned forward of and below the upper end of the shock absorber,
    wherein the upper end of the shock absorber is positioned adjacent the frame element and the lower end of the shock absorber is positioned adjacent the slide frame, wherein pivotal cooperation between (i) the upper end of the suspension arm, (ii) the upper end of the shock absorber, (iii) the lower end of the suspension arm, and (iv) the lower end of the shock absorber provide for a substantially constant motion-ratio as the slide frame collapses toward the frame element.

2. A snowmobile suspension according to claim 1, wherein the frame element comprises a transverse cross bar fixedly attachable to the chassis of a snowmobile.

3. A snowmobile suspension according to claim 1, wherein the lower arm assembly comprises:
two lower arm brackets each having a first end and a second end, the first ends being connected to a transverse tube, which forms the upper end of the lower arm assembly.

4. A snowmobile suspension according to claim 3, wherein the lower end of the shock absorber is pivotally mounted to an extension bracket which is fixedly connected to lower end of the suspension arm.

5. A snowmobile suspension according to claim 3, wherein the lower end of the suspension arm comprises a transverse tube pivotally mounted to a transverse shaft, the transverse shaft being connected to the lower end of the lower arm.

6. A snowmobile suspension according to claim 3, wherein the upper end of the lower arm assembly is pivotally mounted to a second transverse shaft that is fixedly connected at each end to the slide frame.

7. A snowmobile suspension according to claim 1, further comprising:
a first pair of extension brackets each having first and second ends,
wherein the first ends are fixedly connected to the frame element and the second ends have pivotally mounted thereto the upper end of the suspension arm.

8. A snowmobile suspension according to claim 7, wherein the upper end of the suspension arm comprises a transverse upper tube and the lower end of the suspension arm comprises a transverse lower tube, transverse upper tube being connected to the transverse lower tube by at least one connecting beam.

9. A snowmobile suspension according to claim 8, wherein the at least one connecting beam comprises two metal bars.

10. A snowmobile suspension according to claim 8, wherein the at least one connecting beam comprises two metal tubes.

11. A snowmobile suspension according to claim 7, wherein transverse upper tube of the suspension arm is pivotally mounted to a second transverse shaft which is attached at each end to the second ends of the first pair of extension brackets.

12. A snowmobile suspension according to claim 1, further comprising:
a second pair of extension brackets each having first and second ends,
wherein the first ends are fixedly connected to the frame element, the upper end of the shock absorber being pivotally connected to the second ends.

13. A snowmobile, comprising:
a chassis;
an engine disposed on the chassis;
a drive track disposed below the chassis and connected operatively to the engine for propulsion of the snowmobile;
at least one ski disposed on the chassis;
a seat disposed on the chassis, suitable for a rider;
a steering device disposed on the chassis forward of the seat, the steering device being operatively connected to the at least one ski for steering the snowmobile;
a slide frame for engagement with the drive track;
a frame element connected to the chassis;
a lower arm assembly with a lower end and an upper end, the upper end being pivotally mounted relative to the slide frame;
a suspension arm with an upper end pivotally mounted relative to the frame element and a lower end pivotally mounted to the lower end of the lower arm assembly; and
a shock absorber with an upper end pivotally mounted relative to the frame element and the lower end pivotally mounted to the lower end of the lower arm assembly,
wherein the upper end of the suspension arm is positioned forward of and below the upper end of the shock absorber and pivots independently of the upper end of the shock absorber,
wherein the upper end of the shock absorber is positioned adjacent the frame element and the lower end of the shock absorber is positioned adjacent the slide frame,
wherein pivotal cooperation between (i) the upper end of the suspension arm, (ii) the upper end of the shock absorber, (iii) the lower end of the suspension arm, and (iv) the lower end of the shock absorber provide for a substantially constant motion-ratio as the slide frame collapses toward the frame element.

14. A snowmobile according to claim 13, wherein the frame element comprises a transverse cross bar fixedly attachable to the chassis.

15. A snowmobile according to claim 13, wherein the lower arm assembly comprises:
two lower arm brackets each having a first end and a second end, the first ends being connected to a transverse tube, which forms the lower end of the lower arm assembly.

16. A snowmobile according to claim 15, wherein the lower end of the shock absorber is pivotally mounted to an extension bracket which is fixedly connected to lower end of the suspension arm.

17. A snowmobile according to claim 15, wherein the lower end of the suspension arm comprises a transverse tube pivotally mounted to a transverse shaft, the transverse shaft being connected to the lower end of the lower arm assembly.

18. A snowmobile according to claim 15, wherein the upper end of the lower arm assembly is pivotally mounted to a second transverse shaft that is fixedly connected at each end to the slide frame.

19. A snowmobile according to claim 13, further comprising:
a first pair of extension brackets each having first and second ends,
wherein the first ends are fixedly connected to the frame element and the second ends are pivotally connected to the upper end of the suspension arm.

20. A snowmobile according to claim 13, wherein the upper end of the suspension arm comprises a transverse upper tube and the lower end of the suspension arm comprises a transverse lower tube, the transverse upper tube being connected to the transverse lower tube by at least one connecting beam.

21. A snowmobile according to claim 20, wherein the at least one connecting beam comprises two metal bars.

22. A snowmobile according to claim 20, wherein the at least one connecting beam comprises two metal tubes.

23. A snowmobile according to claim 19, wherein transverse upper tube of the suspension arm is pivotally mounted to a second transverse shaft which is attached at each end to the second ends of the first pair of extension brackets.

24. A snowmobile according to claim 13, further comprising:

a second pair of extension brackets each having first and second ends, wherein the first ends are fixedly connected to the frame element, the upper end of the shock absorber being pivotally connected to the second ends.

\* \* \* \* \*